E. S. HOPKINS, Jr.
VIVIGRAPHIC FILM AND PROCESS.
APPLICATION FILED DEC. 24, 1907.
1,286,638.
Patented Dec. 3, 1918.
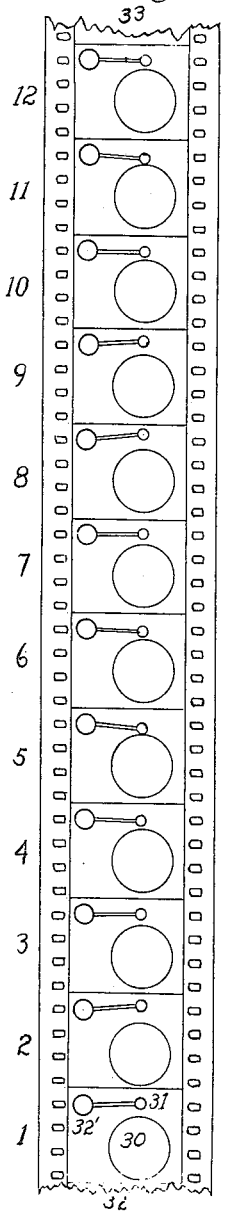
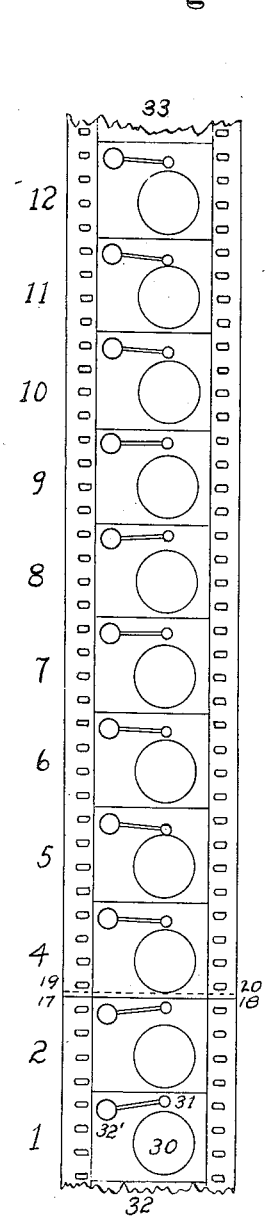
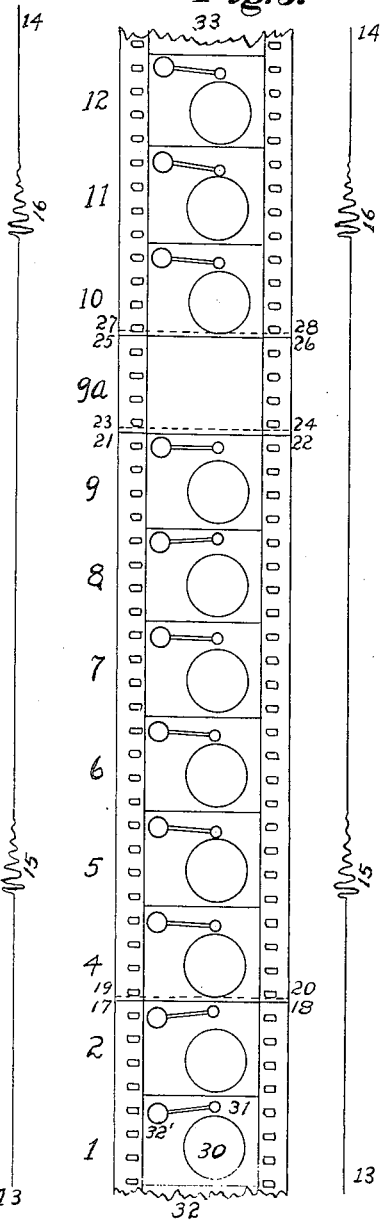
Witnesses:
Albert R Larrabee
John B. Atwell
Inventor:
Edwin S Hopkins Jr.

UNITED STATES PATENT OFFICE.

EDWIN S. HOPKINS, JR., OF NEW YORK, N. Y.

VIVIGRAPHIC FILM AND PROCESS.

1,286,638.  Specification of Letters Patent.  Patented Dec. 3, 1918.

Application filed December 24, 1907. Serial No. 407,895.

*To all whom it may concern:*

Be it known that I, EDWIN S. HOPKINS, Jr., a citizen of the United States, residing at New York, in the county of New York and State of New York, have invented certain new and useful Improvements in Vivigraphic Films and Processes, of which the following is a specification.

My invention relates principally to manufactures designed chiefly to accomplish the synchronization of the effects of motion picture projecting machines, such as kinetoscopes, with the effects of sound reproducing machines, such as phonographs, but it may readily be adapted also to effect the synchronization of the effects of other sorts of sound reproducing machines or automatic musical instruments, such as music boxes, and piano—or other instrument—playing machines or systems of reproducing music such as the telharmonium, with motion picture projecting machines, or motion picture machines with each other, it being within the scope of my invention to synchronize one or more of any one machine mentioned with one or more of the same type or, with one or more of any other types mentioned.

The principal effect of such synchronization is to make it appear to the auditory that the original of the motion picture was accompanied by the originals of the sounds simultaneously emitted by the sound machine, whether that was in reality the case or not: thus obviating when desirable, the difficulties of subjecting an original scene to more than one sort of recording device, and allowing for novel effects, such as the conversation of man and dog, dissolving effects of motion pictures, music, and speech, and effects of superimposition, as of ghosts or submarine scenes.

The principles of my invention are as follows:

As is well known, motion pictures are generally produced by the passage through rays of light focused in a suitable manner, of a succession of more or less transparent photographs, usually mounted on a long film; the motion picture projecting machine, which I shall often hereinafter term the picture machine, meaning by that term a motion picture projecting machine or other similar device as hereinafter described or indicated, being so arranged that each individual photograph on the film is stopped, the light allowed to pass through it, the light then turned off or shut off from such passage, and the individual photograph moved to make place for the next succeeding one of the series, which is subject to the same operation. This is repeated usually about sixteen times a second, the length of time during which each individual photograph of the series on the film remains exposed being greater than the interval of time elapsing between the exposure to the light rays of adjoining successive individual pictures or photographs, usually hereinafter termed individual pictures. Usually an individual picture remains in the light two forty eighths of a second, while one forty eighth of a second is consumed in advancing the next individual picture to the position of exposure.

Further, it is well known that sound reproducing machines, such as phonographs, usually create sound by the vibration of a diaphragm set up by the passage under a needle attached to such diaphragm, of an indented surface, the indentations of which were originally effected by the passage of a fresh or blank impressionable surface under a suitable needle attached to or in communication with a diaphragm moved by sound waves.

I have discovered from a study of these facts, that if a given scene embodying, for example, objects in motion producing sounds, be subjected to some sort of a kinetoscopic or other suitable camera, and simultaneously to a suitable recording device for sound waves, such as a phonographic recording device, that the surface of a sound record will advance an appreciable distance during the time which that part of the film which is to be utilized for making the individual picture, is being exposed to the light through the lens. Further, the sound record moves continuously, therefore, during the time which elapses between one exposure of the film and the next usually approximately sixteen exposures per second of each foot of film, the sound recorder, or the sound record surface in case of a reproduction, will move an appreciable distance.

Thus the sound reproducing machine, which I shall often hereinafter term the sound machine, meaning by that term usually a sound reproducing machine, but also a sound producing machine, continues to emit sounds, not only when an individual picture is being exposed, but also during the time when no image is presented to the eye of the auditory by the picture machine, although this absence of image, owing to persistence of vision, is not observable except as an unsteadiness or flicker.

The indentations which cause a sound machine to emit sounds, examined under a microscope, are seen to be of a widely different character as to size and shape, and it is thus readily possible, by ascertaining by a series of examinations, the characteristic indentations of sounds, to observe by any convenient means from the individual picture, what sort of sound accompanied the original at the moment the individual picture was taken, and then to examine the indentations of the record and discover thereon that portion of the record's surface which corresponds to the accompanying individual picture.

When both sound record and film are taken simultaneously from the same original scene, with both recording machines advancing at absolutely regular speeds, the locations on the sound record corresponding to the several individual pictures will be at uniform intervals. As it is in practice very difficult and in many cases impossible not only to cause the two types of recording machines to proceed at regular speeds, but even to obtain adequate sound and photographic records simultaneously, it will generally be found that when taken simultaneously, the locations on the sound record of portions corresponding to individual pictures will be at variable distances.

The main purpose of my invention is to overcome this irregularity, so that when the film and record are advanced at a fixed ratio of speed, the individual pictures will be exhibited at the same moment at which the corresponding portions of the sound record are producing sounds agreeing in effects with the pictures.

I find it possible to do this by means which have several forms of application.

I find as a convenient means of accomplishing the result, instead of taking sixteen individual pictures per foot of film per second, as is usually done, each individual picture thus accounting for about one sixth of a revolution of an ordinary cylindrical phonographic record of the size most commonly in use; of taking a film with a number somewhat greater than sixteen per second, for example, ninety six per second, involving six feet per second of film, instead of one foot per second. Thus each individual picture will correspond to about one thirty sixth of a revolution of the ordinary phonographic record, that is there will be thirty six individual pictures for each revolution of the record instead of only six. By selecting from the thirty six, six which most nearly correspond to six arbitrarily selected equidistant divisions of the circumference of the sound record, and by discarding the other thirty for each revolution; from the preserved individual pictures, a film may be formed in which the individual pictures will correspond for practical purposes with equidistant intervals of the record groove from beginning to end, so that when such a film and such a record, starting from their initial points, are advanced at a fixed ratio of speed, synchronization of their effects will result. Such a film is an important part of my invention and will be referred to later on.

Having explained certain fundamental principles and certain desirable objects to be attained by my invention, before proceeding with a detailed description of apparatus, I will mention certain other objects, both intermediate and ultimate, to be attained.

It is generally desirable to locate the positions on the record of the corresponding individual pictures, without recourse to the laborious method of microscopic examination, or the less exact method of location by ear.

It is generally desirable, also, not only to synchronize sounds which occurred simultaneously with the originals of the motion picture, but similar sounds, or, sounds quite unrelated, which occurred previously or subsequently, thus making it possible to provide records to correspond to films already made, and films for records already made, whether related or not.

In carrying out my invention, I find it generally desirable to employ the following apparatus, processes and manufactures, but it is to be understood that in carrying out the objects of my invention, less than all of the different mechanisms, processes and manufactures herein described may be employed for some uses, or parts only may be employed, or other mechanisms, processes and manufactures similar may be substituted, and while the preferred forms embodying my invention are shown, it is to be understood that many of the structural details may be varied and many changes in details resorted to, without departing from the scope and spirit of my invention, nor do I limit myself to the particular devices and processes shown, although I believe them especially suited to the ends to be attained by my invention.

In the accompanying drawings forming a part hereof, and in which the same reference letters and numerals indicate the same or corresponding parts—

Figures 1, 2 and 3 show a film and record groove and illustrate the method of making the film synchronous with the record. Such illustrations, however, are purely diagrammatic and illustrative, and do not indicate any specific arrangement. In Fig. 1, 32—33 represents a strip of film composed of individual pictures 1 to 12, illustrating the ringing of a bell 30, by clapper 31, hinged at 32'. 13—14 represents the phonic line of a phonograph record containing the acoustical record of the ringing of the bell. Pictures 5 and 11 of film 32—33 illustrate the clapper in the act of striking the bell. The film and record are assumed to advance downward, and for the purpose of this illustration, the phonic line is represented as of approximately the same length as the film, though in reality it is usually much longer. 15 and 16 in line 13—14 represent the record of the ringing of the bell. Operating the film and record suitably, it will be obvious that if advanced simultaneously at a fixed ratio of speed, and for the purposes of this illustration, the same rate of speed, that the record effect 15 will be in evidence before the clapper strikes the bell on picture 5, although continuing, record effect 16 will be coincident with the next stroke of the clapper on the bell as shown in picture 11. This may happen by chance or design, but as the illustration shows, the distance between the strokes of the bell on the film is six pictures, while on the record it is seven pictures.

In order to cause record effect 15 to coincide with the optical effect of picture 5, I remove an earlier picture, in this case picture 3. In Fig. 2, are shown individual pictures 1 and 2 and 4 to 12, 3 having been eliminated, and 2 and 4 joined by splice 17—18 and 19—20. This causes optical effect of picture 5 to coincide with acoustical effect 15 on the phonic line 13—14. However, owing to the shortening of the early part of the film, optical effect on picture 11, is now in advance of its corresponding effect of the record, 16, and it must be brought into coincidence again. This I accomplish in Fig. 3, by inserting a blank space 9ª, in that part of the film lying between the strokes of the bell. In this case, the blank is inserted between pictures 9 and 10, and spliced as shown in 21—22, 23—24, and at 25—26, 27—28. A duplicate of either 9 or 10 could have been inserted in place of blank space 9ª, or a specially prepared photograph midway between 9 and 10 could have been inserted. In practice, it is generally better to insert a suitable photograph rather than leave the space blank, or at least insert a length of opaque material, as a transparent or translucent space will cause a flash in the motion picture which is disagreeable. Fig. 2 represents a film of the removed or excised type, and Fig. 3 represents from picture 7 to 12, a film of the inserted or interposed type, while Fig. 3, from 1 to 12, includes both excised or removed and inserted or interposed type. The best method is the removed type, as it is accomplished more quickly and cheaply and the removal of a single picture or even several at one point is under most circumstances hardly noticeable in the optical effect.

I have not illustrated the film constructed by the selection of individual pictures, since it offers when completed properly, no features whereby it can be distinguished from the ordinary film. It is, however, an important part of my invention, and is best explained by describing the process of its manufacture.

Instead of an ordinary film of sixteen individual pictures per foot per second, a film preferably made with more than that number of individual pictures per second is employed, the more per second the more nearly perfect being the result. Now at six individual pictures for each revolution of a cylindrical phonographic record of about two inches in diameter, the space in the record groove accounted for by one individual picture is about one inch in length, about one third of which passes when no image is visible to the eye of the spectator.

But if a film is made with thirty-six individual pictures per revolution, the space accounted for in the groove length will be only about one-sixth of an inch. Now as in such an arrangement, six exposures must be made by the picture machine at each revolution of the record, and as the machines are arranged to advance at a fixed ratio of speed, then assuming six equidistant intervals on the periphery of the record as representing the middle of the exposure of each individual picture by the motion picture machine, it will be possible from the thirty-six pictures per revolution, to select those which will not be more than half the interval to which each individual picture corresponds away from the arbitrarily selected middle point corresponding to the exposure, or a discrepancy at most, not more than one twelfth of an inch as measured on the record groove. Having selected the individual pictures which correspond nearest to such equidistant points on the record, the remaining thirty for each revolution are cut out and discarded and the selected individual pictures are joined together in the proper sequence, which at the rate of six per revolution of the record, will produce the motion picture. Each individual picture is thus exposed for a longer time than when it was taken, which is inconsequential. It will often, however, be found unnecessary to make so many individual pictures, a less nearly perfect film so constructed being obtainable with a fewer number of individual pictures per second. Such a film is mostly desirable in cases where a record already exists.

In using such films with corresponding records, it is possible and desirable to connect the picture machine and the sound machine to each other directly by mechanical means, so that an individual picture is advanced to the position of projection coincidentally with the passage of a portion of the record groove corresponding thereto.

Although not illustrated, sound producing machines, such as music boxes with disks, piano players with rolls, etc., may readily have films arranged to synchronize with them on the principles explained in this invention. This is very effective for the figures of dancing.

A modified application of the principle of the film of selected pictures, less perfect in result, but of great practical value, is explained more fully hereafter.

Having now described certain of the mechanism employed, a more detailed explanation of how the objects of the invention are attained by the means referred to is necessary.

As already indicated, the objects of the invention include the synchronization of effects of records and films under three principal contingencies (1) those made simultaneously from the same original scene, and those made from different originals and not simultaneously, whether (2) the film was first made, or (3) the record was first made.

In the case of pictures and records made from the same original simultaneously, it is desirable to obtain the two sorts of records by advancing the recording machines at a fixed ratio of speed, absolutely so if possible. Any variations may then be corrected as herein indicated.

When a film exists and it is desirable to obtain a sound record suitable for synchronization therewith, the following is a useful procedure within my invention:

By ordinary use of the film it is ascertained, or otherwise, what agencies will best be suited to produce sounds corresponding to those which probably accompanied the original scene, or those which it is desired shall be synchronized with the film as it exists. By practice with the suitable agencies, that is, repeating the sounds a number of times in the proper succession, I produce a series of suitable sounds for a period of time approximating that of the duration of the effect of the film as used. For example, actors playing a scene can go through with the necessary words in the same length of time, with only a few seconds variation. The sounds are then recorded in the ordinary manner on suitable records, and from the record, by microscopic examination, or otherwise, the individual pictures of the film are so selected as to produce a film having the quality of synchronization with the record.

When a record exists and it is desired to obtain a film which will synchronize therewith, the following is a useful procedure within the scope of my invention. By use or examination of the record, it is ascertained what agencies will produce pictures corresponding to the scene from which the recorded sounds were probably derived, or it is ascertained what agencies will produce pictures such as are desired to be synchronized with the record as it exists. By practice with suitable agencies it is possible to reënact at about the same rate of speed, the desired scene, and when this approximation through practice or otherwise is sufficiently close, the scene is then subjected to the camera, preferably not such a motion picture camera as now commonly in use, such as takes about sixteen individual pictures per second, but one which is capable of making a considerably greater number. From the resulting film, with considerably more than the usual number of individual pictures per second per foot, may by selection of certain individual pictures, be constructed such a film as has hereinbefore been described.

In this description, the simplest and most primary combinations are referred to, one picture machine and one sound machine being considered to be synchronized, but it is to be understood that multiple numbers may be introduced in pursuance of the principles of my invention, as described, or by such other means as is herein described capable of extension within the scope of my invention.

The objects of the second and third systems of production are mainly to produce records and films that bear a fixed relation to each other, for example, a film which contains a number of individual pictures, corresponding to a record, the length of whose grooves is divided into a number of spaces equivalent to the number of individual pictures, the spaces being equal to each other in length.

By whatever means this is accomplished, it becomes apparent that such corresponding film and record, heretofore unknown in the art, I believe, may be utilized by various means of production.

Within my invention are also included less perfect means of production, which may best be described as films from which some individual pictures have been omitted or excised, or in which some blank individual pictures or spaces have been inserted, on the following principles.

If in the production of a record for a film, or a film for a record, as the case may be, an exact correspondence is not arrived at, which will practically invariably be the case, then the film will either be too long or too short as compared in synchronism with the record. Thus, for example, when revolved for reproduction at regular rates of speed, such as would have produced perfect synchronization, had the record and film been taken simultaneously from the same original scene, the motion picture will either gradually get ahead of the sound machine so that, in such case, for instance, of a speaker speaking, the words will not be heard until after the speaker's lips are seen to have moved for such sound, or get behind the record so that the words, in such case, will be heard before the speaker opens his mouth, which is highly undesirable, or the film will now be ahead and now behind the record as the scene progresses, even a more undesirable effect.

Considering the case in which the film gets ahead, the reason is that succeeding pictures on the film are too close together in point of time so that, by cutting the film apart at such points and inserting one or more, usually one, blank individual picture, either opaque or transparent, or else an individual picture which is a duplicate of either of the individual pictures adjoining the cut, or otherwise photographically suitable the record is permitted time to catch up, the effect on the motion picture is not greatly prejudicial, and approximately satisfactory synchronization is effected, though of course, not the perfection possible with the highly processed film hereinbefore described.

Considering the case in which the film gets behind, the reason is that succeeding pictures on the film are too far apart in point of time, that is, it will not be entirely run through until after the record is through. At convenient intervals, therefore, I remove one individual picture, or more than one, and attach the ends created by cutting out that individual picture together, and thus the tendency of the film to get behind is corrected and the motion picture is not much prejudiced.

Considering the case in which the film is at one moment ahead and presently behind and the opposite, which is most generally the case, by inserting individual pictures or spaces where the film gets ahead, and removing individual pictures where the film gets behind, a processed film is produced which for practical purposes is all that will ever be required for the purpose of synchronization.

I have reproduced a scene from the play "Rip Van Winkle" by the method of removing individual pictures, from a film and a record which were made years apart, so that now, long after the death of Joseph Jefferson, who made both the film and record at different times, I reproduce a scene which gives a perfect impression of talking motion pictures, and which has great historic value. In some parts of the film it was necessary to remove as many as thirty individual pictures to overtake the record, which causes a slight jerk at that point in the picture, though not very noticeable while at other points, considerable stretches correspond without the necessity of removing any individual pictures.

The term fixed ratio of speed, as herein used refers to such proportion of speed as one revolving or passing body bears to another, such for example as a shaft bears to another shaft when both are revolving at a fixed rate of speed. Thus if the first shaft revolves ten times while the second revolves nine times, they are revolving at a fixed ratio of speed. Or for example, if a foot of film passes while a record revolves twice, their progress is at a fixed ratio of speed. A fixed ratio of speed as herein referred to may be either at a fixed rate of speed or not. Thus, for example, one shaft may revolve twenty times while another revolves thirty and shortly thereafter the first may have reached a speed of forty revolutions while the latter revolves at sixty revolutions, but the ratio of speed remains fixed. A fixed ratio as here used may also include a progressive ratio, thus for example while one shaft is revolving ten times, the second may revolve twelve times, and while the first revolves another ten times, the second may revolve fourteen times, and sixteen and eighteen and so on regularly for every ten revolutions of the first shaft, though such progressive ratio, while within the meaning of fixed ratio herein used, may or may not be at variable rates of speed. Such progressive ratio of speed is useful in the case of a disk record machine, in which the groove length, the groove being spiral, is shorter with each revolution as the center of the disk is approached.

It is to be noted that films and records bearing a fixed relation are new in the art, and the claims hereto appended are to be construed with that fact in view.

As used herein the terms processed film, or synchronized film embrace films made to have a fixed relation to a record for the purposes of synchronization.

As used herein, the terms picture machine and motion picture machine and motion picture projecting machine, embrace all machines adapted to create the illusion of objects in motion, not only the ordinarily most used machines of such nature, such as the cinematograph, cameragraph or the kinetoscope, but machines operated in other ways, such for example as the mutoscope. The mutoscope, unlike the cameragraph, which projects the images of a transparent film on which are photographs against a screen at some distance from itself, stopping each individual picture for a brief space; operates by having the individual photographs mounted on a hub after the manner of spokes in a wheel, without, however, a rim. On being forced past a projection suitably arranged, each individual leaf or photograph flies out of position and discloses the next leaf, which proceeding at a rapid pace exhibits to the eye a number of photographs in a short space of time, producing the effects of motion pictures. It is evident that no new invention is required to effect synchronization between such a machine and a record on the principles herein set forth. The fact that the mutoscope usually presents photographs or pictures directly to the eye instead of projections of photographs or pictures is of no consequence, as the synchronization of its effects with those of the phonograph or talking machine is within the present invention. Leaves may readily be excised from the mutoscope as individual pictures are from a film, and similarly inserted. Other sorts of apparatus may be employed, for example, pictures may be reflected instead of being penetrated by the rays of light. In another case photographs or pictures may be mounted on the periphery of a wheel instead of in the form of free spokes as in the mutoscope. The synchronization of all these in the manner indicated is of course within my invention.

The term film as herein used embraces not only the commonly used tape-like- or ribbon-like-film, bearing in sequence photographs of objects in motion, but also any form or arrangement of photographs or other pictures when adapted to produce the effects of objects in motion. The word film thus applies to the succession of photographs of a mutoscope or any succession of pictures or photographs when adapted to be displayed in quick succession to the eye, either directly or indirectly, through projection or otherwise. The term individual picture, refers not only to the individual pictures or photographs on a tape-like film, but also the individual pictures of any sequential series, as the individual photographs of a mutoscope wheel for example, which are adapted to produce the effects of objects in motion.

The combination of a mutoscope and a phonograph is a part of the present invention and in a commercial sense quite important. I give the words and terms individual picture, film, picture machine, motion picture machine and motion picture projecting machine these special designations or meanings in the present description and claims, in addition to the ordinary significance of the said words, in order to save repetition of claims.

It is also apparent that by employing films and records, providing such members have been made with a fixed relation to each other, that it will be possible to cause a synchronous effect without any connection between the members to be synchronized, by the employment in the advancing of the members of any device which will cause the revolution of a member at a selected velocity. Thus, for example, a number of devices might be employed which would revolve a disk, for example, seventy six times a minute, and without any connection therewith a motion picture machine could in a number of ways be caused to exhibit a certain number of individual pictures per minute which would synchronize with the sounds produced by such seventy six revolutions per minute of the record. By starting the machines simultaneously, synchronization would be effected. So many means may be employed to accomplish this that it is unnecessary to describe them herein, further than to thus point out that such arrangements are within the present invention.

The word film as herein used, in addition to the meanings already specially pointed out refers to the ordinary tape-like transparent or translucent film, photographic or otherwise, suitable for projecting motion pictures, or in some uses suitable for receiving exposures of objects in motion when operated in a suitable camera under proper conditions; and the word film also refers to any sort of tape-like or other surfaces, bearing pictures or photographs or impressions suitable to render it or reproductions of it, capable of being used for the projection of production of motion pictures.

The word record as herein used refers to the usual wax or hard rubber-like disk or cylinder used in sound reproducing machines, and to such other means as may be employed for such purposes as records are employed.

The word member or members as herein used, refers to the instruments or machines, or films and records to be synchronized or whose effects are to be synchronized and it is assumed that if the apparatus and films and records be synchronized that their effects will be synchronized, or if the effects be synchronized, the machine, instruments, apparatus, members, films and records will necessarily be in synchronic operation.

The word film as herein used also refers to any tape-like substance used for phonographic record purposes, and the word record also includes such form of record. This particular form of phonographic record is distinguished in this invention by a broad applicability to the various principles involved. It will be readily seen that the tape-record, though not much used in the art lends itself at every turn so to speak, to vivigraphic treatment.

Being in the form of a film it can readily be excised as to certain portions or have spaces inserted.

A tape film record is also included within the scope of my invention, that is a cinematographic film bearing along the edge a phonic line, though the speed at which it is necessary to run the phonic line makes the pictures pass so rapidly that the device is of little practical use.

A tape-record being subject to practically all the operations to which I subject both cinematographic films and phonograph records, is thus within my invention, and occupies a unique position in the vivigraphic art, heretofore an unknown art.

This is particularly true with respect to that form of tape record which does not bear a phonic line with indentations, but which is in the form of a photographic strip, which when developed is the record of the variations in intensity of a light which was affected by sounds while the film was being exposed to it. Light again being passed through such a film, and falling on selenium, the variations in density are through the variations in effect on the selenium employed to give off sounds again through suitable apparatus. Such a tape-record is subject to the scope of my invention.

Chemical phonographs in which electro deposition occurs are likewise within my invention, as such records are readily subject to the operations herein disclosed for the first time.

The term individual pictures as used herein refers not only to the individual photographs of a film for the reproduction of motion pictures, but also includes inserted portions of a film designed to take the place of individual photographs or to lengthen the interval between individual photographs.

What I claim is:

1. An artificially synchronized film in which the locations of the optical effects are so altered relatively to each other as to be in the same proportionate locations on the film, as are the analogous acoustical effects of a sound record on the record, whereby to artificially synchronize it with the record.

2. A motion picture film, artificially synchronized with a sound record, in which selected portions of the optical effects are placed at selected intervals.

3. An artificially synchronized film in which between individual selected pictures blank spaces of selected extent are inserted, whereby to make the film synchronous with a phonographic record.

4. An artificially synchronized film in which between some of the individual pictures spaces of varying degrees of extent are inserted, whereby to make the film synchronous with a phonographic record.

5. An artificially synchronized film having certain individual pictures inserted, whereby to make it synchronous with a phonographic record.

6. A film having certain individual pictures inserted which were not originally therein, such inserted pictures being other than those in immediate natural sequence, whereby to cause the film to be artificially synchronous with a phonograph record.

7. An artificially synchronized film from which have been discarded one or more selected individual pictures at selected places, substantially as and for the purpose described.

8. An artificially synchronized film from which have been discarded between each two successive remaining individual pictures, one or more individual pictures, substantially as and for the purpose described.

9. A film artificially synchronized with a sound record comprising selected optical effects from between which other selected optical effects are omitted; and selected interposed blank spaces; at selected intervals.

10. A film artificially synchronized with a sound record comprising selected individual pictures from between which other selected individual pictures are omitted; and selected interposed blank spaces: at selected intervals.

11. A film artificially synchronized with a sound record comprising selected individual pictures from between which other selected individual pictures are omitted: and selected individual pictures interposed: at selected intervals.

12. A film artificially synchronized with a sound record comprising individual pictures obtained by selecting from more than one film taken of a scene such individual pictures as will most nearly represent the actions which correspond with the words of an analogous sound record, whereby the film is made artificially synchronous with the sound record.

13. The process of making a motion picture film artificially synchronous with a sound record which consists in making a film and in then altering the locations of the optical effects thereof relatively to each other to such extent that they are in the same proportionate locations along the film as are the analogous acoustical effects of the sound record along the record.

14. The process of making an artificially synchronized film which consists in making a film containing more individual pictures than are necessary for the proper production of a motion picture; in inserting individual pictures at selected places and in discarding individual pictures at selected places, thereby making the film artificially synchronous with a phonographic record.

15. The process of making an artificially synchronized film which consists in making a film containing more individual pictures than are necessary for the proper production of a motion picture; in inserting blank spaces of selected extent at selected places and in discarding selected individual pictures, thereby making the film synchronous with a phonographic record.

16. The process of making a film artificially synchronous with a sound record which consists in making a film and in selecting the individual pictures of the film which most nearly represent the actions which correspond to the sound record's sounds and in interposing at selected intervals blank spaces, thereby making the film artificially synchronous with a sound record.

17. The process of making a film artificially synchronous with a sound record which consists in making a film and in selecting the individual pictures of the film which most nearly represent the actions which correspond to the sound record's sounds and in interposing at selected intervals additional individual pictures, thereby making the film artificially synchronous with the sound record.

18. The process of making a film artificially synchronous with a sound record which consists in making the film and in interposing blank spaces of selected extent at selected intervals.

19. The process of making a film artificially synchronous with a sound record which consists in making a film and in interposing one or more additional individual pictures at selected intervals.

20. The process of making a motion picture film artificially synchronous with a sound record which consists in making a film, and in omitting one or more individual pictures at selected places, thereby making the film artificially synchronous with a phonograph record.

21. The process of making a motion picture film artificially synchronous with a sound record which consists in making a film, in omitting one or more individual pictures and in interposing one or more additional individual pictures, at such selected places as will cause the optical effects of the film to be in the same proportionate relation to each other as are the analogous acoustical effects of the record with which the film is synchronized.

22. The process of making an artificially synchronized film which consists in taking more than one film of a scene and in selecting from such films such individual pictures as will most nearly represent the actions which correspond with the words of an analogous sound record, the film thus being made synchronous with the sound record.

23. The process of making a motion picture film artificially synchronous with a sound record which consists in making a negative of a film and in making a positive film therefrom, omitting one or more individual pictures at selected locations, the positive film being thereby made synchronous with the sound record.

24. The process of making a motion picture film artificially synchronous with a sound record which consists in making a negative of a film and making a positive film therefrom, omitting one or more individual pictures at selected locations, and in inserting one or more individual pictures or blank spaces at selected locations, the positive film being thereby made synchronous with the sound record.

25. The general process of making a motion picture film artificially synchronous with a sound record which consists in making the film's effects occupy a position relatively as far from the initial point of the film as the analogous effects of the sound record are from the initial point of the sound record by means of operations on or in connection with the film after the negative is taken.

26. The process of making a motion picture film artificially synchronous with a sound record which consists in making a negative of a film and making a positive film therefrom, inserting one or more individual pictures more than once, at selected locations on the positive, the positive film being thereby made synchronous with the sound record.

27. The process of synchronizing a motion picture film with another sense impression record by artificially modifying the spacing of the optical effects thereon.

EDWIN S. HOPKINS, Jr.

Witnesses:
 JOHN F. SHERIDAN,
 EDWARD F. ADAMS.